(12) United States Patent
Turner et al.

(10) Patent No.: US 7,091,627 B2
(45) Date of Patent: Aug. 15, 2006

(54) CONTROLLER FOR A POWER TRAIN

(75) Inventors: Michael James Turner, Leeds (GB); Paul Andrew Sykes, Leeds (GB)

(73) Assignee: Switched Relunctance Drives, Limited, Harrogate (GB)

( * ) Notice: Subject to any disclaimer, the term of this patent is extended or adjusted under 35 U.S.C. 154(b) by 169 days.

(21) Appl. No.: 10/836,874

(22) Filed: Apr. 30, 2004

(65) Prior Publication Data
US 2004/0222639 A1 Nov. 11, 2004

(30) Foreign Application Priority Data
May 6, 2003 (GB) ................................. 0310343.9

(51) Int. Cl.
*F02M 11/06* (2006.01)

(52) U.S. Cl. .................... 290/40 C; 290/40 A; 322/24; 322/28; 180/65.2

(58) Field of Classification Search .............. 290/40 C, 290/40 A; 322/24, 28; 180/65.2
See application file for complete search history.

(56) References Cited

U.S. PATENT DOCUMENTS

| | | | |
|---|---|---|---|
| 5,794,735 A | | 8/1998 | Sigl |
| 6,283,240 B1 * | | 9/2001 | Beever ....................... 180/178 |
| 6,311,117 B1 * | | 10/2001 | Winner et al. ................ 701/93 |
| 6,615,127 B1 * | | 9/2003 | Hellmann et al. ............ 701/96 |
| 6,628,197 B1 * | | 9/2003 | Poguntke et al. ........... 340/479 |
| 6,661,109 B1 * | | 12/2003 | Fukasaku et al. ......... 290/40 C |
| 6,697,727 B1 * | | 2/2004 | Miller et al. .................. 701/70 |
| 6,782,961 B1 * | | 8/2004 | Ishikawa et al. ............ 180/197 |
| 6,784,563 B1 * | | 8/2004 | Nada ......................... 290/40 C |
| 6,878,096 B1 * | | 4/2005 | Winner et al. ................ 477/94 |
| 6,915,201 B1 * | | 7/2005 | Ott et al. ...................... 701/93 |
| 6,965,173 B1 * | | 11/2005 | Fukasaku et al. ......... 290/40 C |

* cited by examiner

*Primary Examiner*—Tran Nguyen
*Assistant Examiner*—Iraj Mohandesi
(74) *Attorney, Agent, or Firm*—Dicke, Billig & Czaja, PLLC

(57) ABSTRACT

A power train controller can operate in either motoring or braking modes. Its prime mover accepts a limited proportion of braking power and the remainder of the braking power is dissipated in an energy dump. A control system is arranged to maintain the voltage bus of the power train at a constant value throughout both modes.

15 Claims, 4 Drawing Sheets

CONTROLLER FOR A POWER TRAIN

CROSS-REFERENCE TO RELATED APPLICATION

The subject matter of this application is related to the subject matter of British Patent Application No. GB 0310343.9, filed May 6, 2003, priority to which is claimed under 35 U.S.C. § 119 and which is incorporated herein by reference.

BACKGROUND OF THE INVENTION

1. Field of the Invention

Embodiments of the present invention generally relate to a controller for a power train. More particularly, but not exclusively, embodiments of the present invention relate to controlling the reversible power flow in a system having an electrical machine and a prime mover capable of absorbing some power.

2. Description of Related Art

Some stand-alone power systems comprise a prime mover, an electrical machine acting as a generator, and an electrical load which simply absorbs the generated electrical power. In such systems, the power flow is unidirectional and has no need to reverse. The control of such systems is relatively straightforward. In other systems, however, the electrical load may at times act as a temporary source of power and the power flow in at least part of the system then reverses. The control of such systems is more complex.

An example of a reversible power flow system is a hybrid electrical vehicle. The power train may comprise: a prime mover, e.g. an internal combustion engine; an electrical machine coupled to the prime mover and normally acting as generator; one or more electrical machines arranged as traction motors driving the wheels of the vehicle; and a control system supervising the power flow. FIG. 1 illustrates a typical example. The engine 10 is rigidly coupled to an electrical machine 12 which mainly acts as a generator. The output of the generator appears on an electrical bus 13 and is supplied to one or more traction motors, shown schematically as 14. These motors may be driven directly from the voltage bus (e.g. they could be DC machines) or they may have interposing power electronics (e.g. they could be induction or switched reluctance machines).

When the demand from the vehicle operator is for the vehicle to proceed, the control system 17 selects the most appropriate speed and throttle settings for the engine, arranges the excitation of the generator to produce the required power output, and sets the voltage on the bus 13 which will deliver the required power to the traction motor(s). The system is then said to be motoring and the direction of power flow is shown by arrow 16. When the demand from the vehicle operator is for the vehicle to slow or stop, the control system 17 removes the demands to the engine, and arranges a demand for the traction motors to act as generators, delivering power to the bus 13 and thus braking the vehicle. The system is then said to be braking and the direction of power flow is shown by arrow 18. The voltage of bus 13 rises and some action must then be taken to dissipate power in order to prevent the voltage rising to an unacceptable level. All of this is known in the art.

FIG. 2 shows more detail of a known control system. The engine is controlled by an engine management unit (EMU) 22 which receives commands from the overall control system 17 (see FIG. 1). The electrical bus 13 generally supplies other auxiliary loads 20 which have their own control systems (not shown). The generator 12 has a specific controller 23, receiving an input from comparator 24. The comparator takes a signal representative of the voltage of the bus 13 and compares it to a desired level $VS_1$. In a known system $VS_1$ is 650V. The controller 23 controls the generator to maintain the bus at or near $VS_1$, and may use, e.g. a proportional/integral/derivative (PID) strategy to achieve this.

The term 'comparator' is used here and throughout to denote a device which compares two quantities and produces a value representing the difference between them. Such a device is also known as a 'differencer' or 'subtractor'.

When the system is in braking mode, the bus voltage rises unless power is removed from the bus, for example, by the auxiliary loads 20. One common way of preventing this rise is to provide a dump 21 which simply dissipates the energy. Typically, the dump comprises a grid of resistors capable of dissipating the required power by either air or liquid cooling. This dump is connected to the bus 13 by a power switch 27 under the control of a controller 26 which receives an input from comparator 25. The power switch is typically an insulated gate bipolar transistor (IGBT) or MOSFET. The comparator 25 takes a signal representative of the voltage on the bus 13 and compares it to a desired level $VS_2$. The controller 26 controls the switch 27 to maintain the bus at or near $VS_2$ and may use, e.g. a PID, pulsed (e.g. pulse width modulated (PWM)) or bang-bang (on-off) strategy to achieve this.

$VS_2$ is typically set to a value significantly in excess of $VS_1$ so that there is no risk, even in an electrically hostile environment, of the power switch conducting when the system is still in motoring. If it did conduct, it would needlessly waste power from the engine and greatly reduce the efficiency of the system. A typical value of $VS_2$ is set 50V higher than $VS_1$. When the vehicle enters the braking mode, the power is firstly absorbed from the bus by the auxiliary loads. When they can no longer absorb more power, the bus voltage rises until $VS_2$ is reached, bringing the dump into operation.

While this scheme is successful in allowing the traction motors to brake, it requires that the dump resistor 21 is sufficiently highly rated to absorb all the power in excess of that taken by the auxiliary loads. This can be expensive, and also requires a separate cooling arrangement for the dump. In addition, the step in bus voltage associated with moving from one set point to the other (i.e. $VS_1$ to $VS_2$) is generally disadvantageous to the traction motors since it changes the braking characteristics and can give rise to uneven braking effort. Further, the auxiliary loads are exposed to the varying voltage and this may be at least a nuisance to the user if their outputs change as the bus voltage varies.

A refinement of the above basic scheme is to use the prime mover itself to absorb at least some of the braking power. If the electrical machine 12 is operated as a motor, it will drive the prime mover. In many vehicles the prime mover directly supplies other mechanical loads (e.g. a power take-off on an agricultural vehicle) so these loads can then be driven by the braking power, saving on fuel for the prime mover. Further, driving the engine above its idle speed will absorb power by dissipation of hydraulic loss in the engine. These losses are passed into the cooling system of the engine and/or lost in exhaust gas. Typically, an engine may be able to dissipate 10–30% of the peak braking power required, so this can produce useful savings in the provision of an energy dump.

However the limit depends on a number of factors, including engine condition and the altitude and temperature at which the engine operates.

When engine braking is implemented, the current on voltage bus 13 reverses direction, giving power flow from the traction motor 14 to the machine 12, which is now acting as a motor. This forces braking power into the engine, raising its speed. Since the engine has a working speed limit, a speed signal is fed to a limit circuit, which effectively clamps the mechanical input power to the engine at a safe limit. Further braking power then causes the bus voltage to rise as before, bringing in the dump when the higher voltage is reached. While such schemes are an improvement over the basic scheme of FIG. 2, they still suffer from a relatively large voltage swing on the bus as the engine reaches the limit of its braking power.

SUMMARY OF THE INVENTION

In one form, an embodiment of the present invention provides a controller for a power train which includes a prime mover, a first electrical machine mechanically connected to the prime mover, a second electrical machine electrically connected to the first electrical machine by a voltage bus, and dissipation means connected to the voltage bus for dissipating electrical power, the controller comprising: means for providing a speed signal indicative of a speed of the prime mover; and first control means responsive to the speed signal to divert power generated by either the first or second electrical machines on the bus to the dissipation means.

This avoids the drawbacks of previous schemes by enabling the control loop of the dissipation means in response to the engine speed rather than the bus voltage.

In one embodiment, the invention also extends to a method of controlling the voltage on the voltage bus of a power train which includes a prime mover, a first electrical machine mechanically connected to the prime mover, a second electrical machine electrically connected to the first electrical machine by a voltage bus and dissipation means connected to the voltage bus for dissipating electrical power, the method comprising: providing a speed signal indicative of a speed of the prime mover; and diverting power on the bus to the dissipation means in response to the speed signal.

In another embodiment, the invention also extends to a power train system comprising a prime mover operable to deliver and absorb mechanical power, a voltage bus, a first electrical machine operable as a generator to generate electrical power onto the voltage bus from the power delivered by the prime mover, and as a motor to provide the mechanical power absorbed by the prime mover; at least one second electrical machine connected to the voltage bus and operable to be driven by the electrical power generated by the first electrical machine and as a generator to deliver electrical power onto the voltage bus to drive the first electrical machine; dissipation means for dissipating electrical power from the voltage bus; means for providing a speed signal indicative of the speed of the prime mover; and a controller responsive to the speed signal and the voltage on the bus to divert power from the bus to the dissipation means to maintain the bus voltage at a substantially constant level.

In another embodiment of the invention, the information on prime mover speed can be used to dissipate increasing amounts of power as the speed of the prime mover rises. This addresses the problem of voltage swings by gradually dissipating electrical power.

With embodiments of the invention it is possible to provide a control scheme which avoids large voltage swings on the bus yet re-cycles the maximum amount of braking energy to the loads which can absorb it, while minimizing the amount which has to be dissipated in a separate dump.

BRIEF DESCRIPTION OF THE DRAWINGS

Other aspects and advantages of the invention will become apparent upon reading the following detailed description of exemplary embodiments of the invention and upon reference to the accompanying drawings, in which.

DETAILED DESCRIPTION OF PREFERRED EMBODIMENTS

Figure 1:
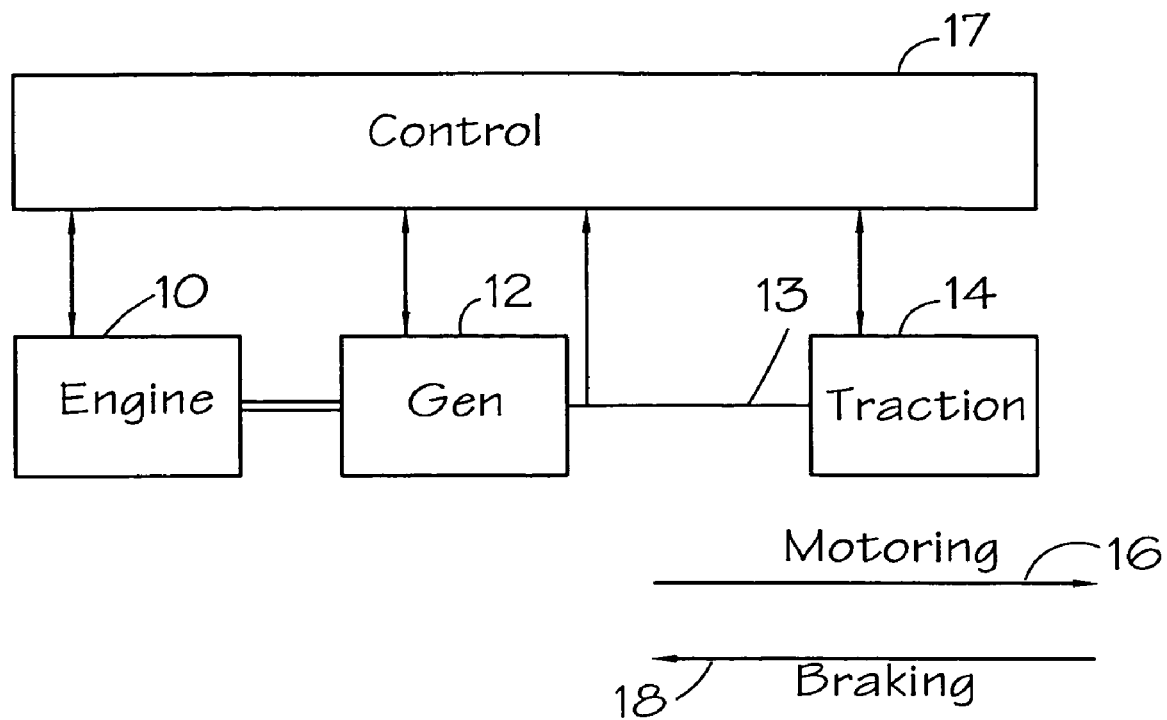
FIG. 1 shows a known schematic diagram of a power train.
Figure 2:
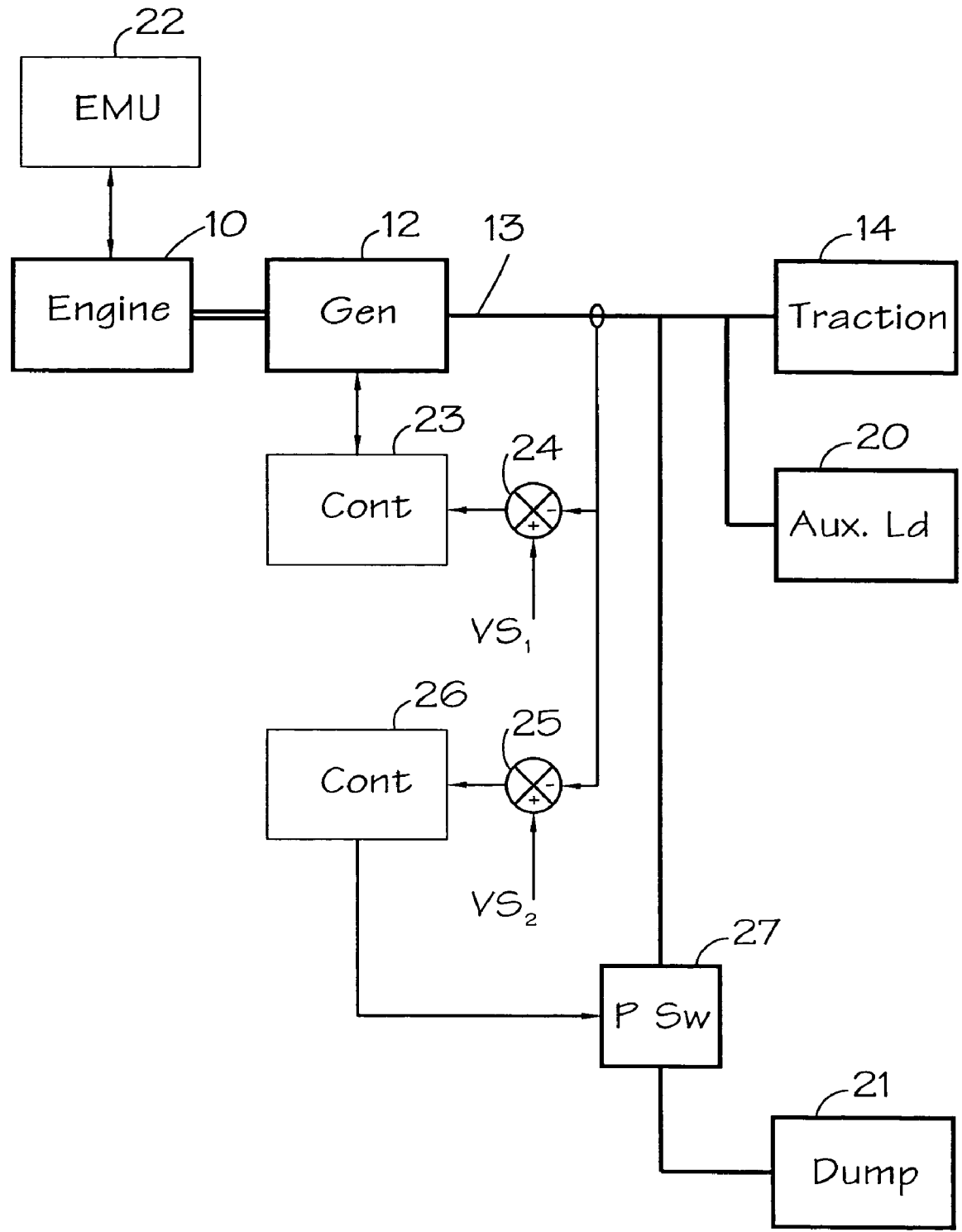
FIG. 2 shows a known control system for the power train of FIG. 1.
Figure 3:
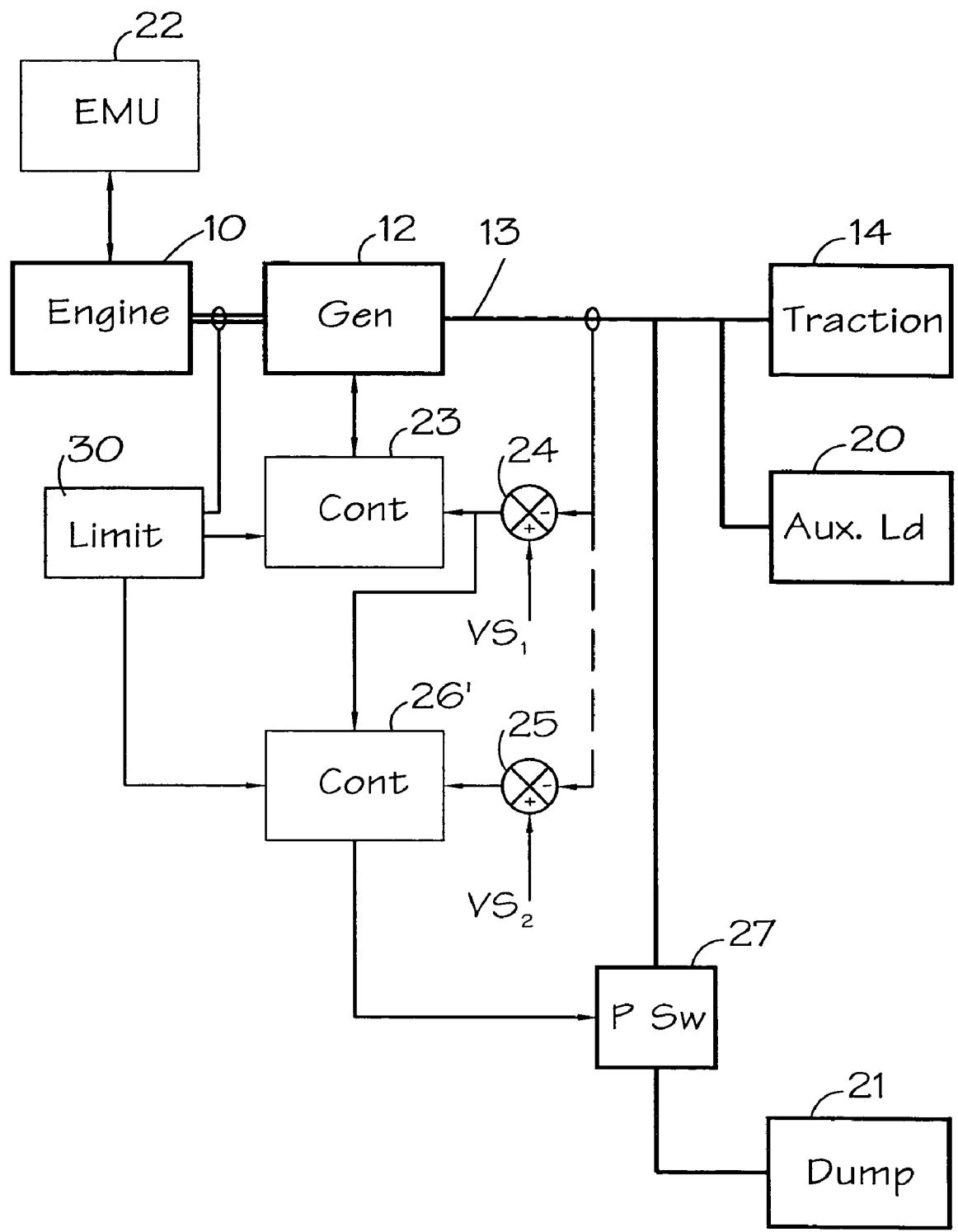
FIG. 3 shows a control schematic according to one aspect of the invention.

FIG. 3 shows a control schematic of one embodiment of the present invention. The inner control loop of the prior art remains in place, so that as the power train moves into braking, PID controller 23 increases the motoring duty of the electrical machine 12 in order to keep the bus voltage at or about $VS_1$. The engine, or its mechanical loads, absorbs power, with its speed rising as required in order to achieve power balance. A speed limiter 30 is connected to monitor the engine speed and to provide an output to the controller 23 to cause the generator 12 to clamp its mechanical input power to the engine 10 at a safe limit. When the engine speed reaches the maximum safe operating speed, the limit function 30 prevents the controller 23 from demanding more torque from the machine 12 acting as the motor, and a second PID controller 26' is enabled in an outer control loop. This second controller 26' is responsive to the outputs from both the limit function 30 and the comparator 24. As the braking power increases further and the voltage bus tries to rise, the controller 26' progressively brings in the dump 21 while maintaining the bus at or around $VS_1$. In this embodiment, the control of the power switch 27 is by PID control using PWM based on feedback of the bus voltage, according to embodiments of the invention, allowing the duty cycle to be gradually increased in line with rising braking power. Other control algorithms optionally are used for any of the controllers referred to as will be appreciated by the skilled person.

Note that the control loop using $VS_2$ and comparator 25 is not strictly necessary, since the voltage of the bus is now held at $VS_1$ throughout the braking cycle. However it is a contingency measure, so that if there were a failure in the motor controller 23 or the EMU 22, the consequent rise in bus voltage would be held at the higher level of $VS_2$. It would also come into play if, for example, there were a sudden removal of load while the power train was motoring and the EMU could not shut the engine down fast enough.

The technique illustrated in FIG. 3 is a significant improvement over the prior art. In this embodiment the strategy is to saturate or limit the inner closed loop control around the machine 12 when the speed of the engine 10 becomes excessive and to enable the outer control loop. This outer loop is responsive to both engine speed and bus voltage and dissipates power accordingly through the dump resistor 21. However, it sometimes requires considerable care to arrange the parameters of the controllers 23 and 26' to achieve a smooth transfer of control when the action of limiter 30 causes the controller 23 to saturate. This is particularly the case if integral terms are used in the controllers.

Figure 4:
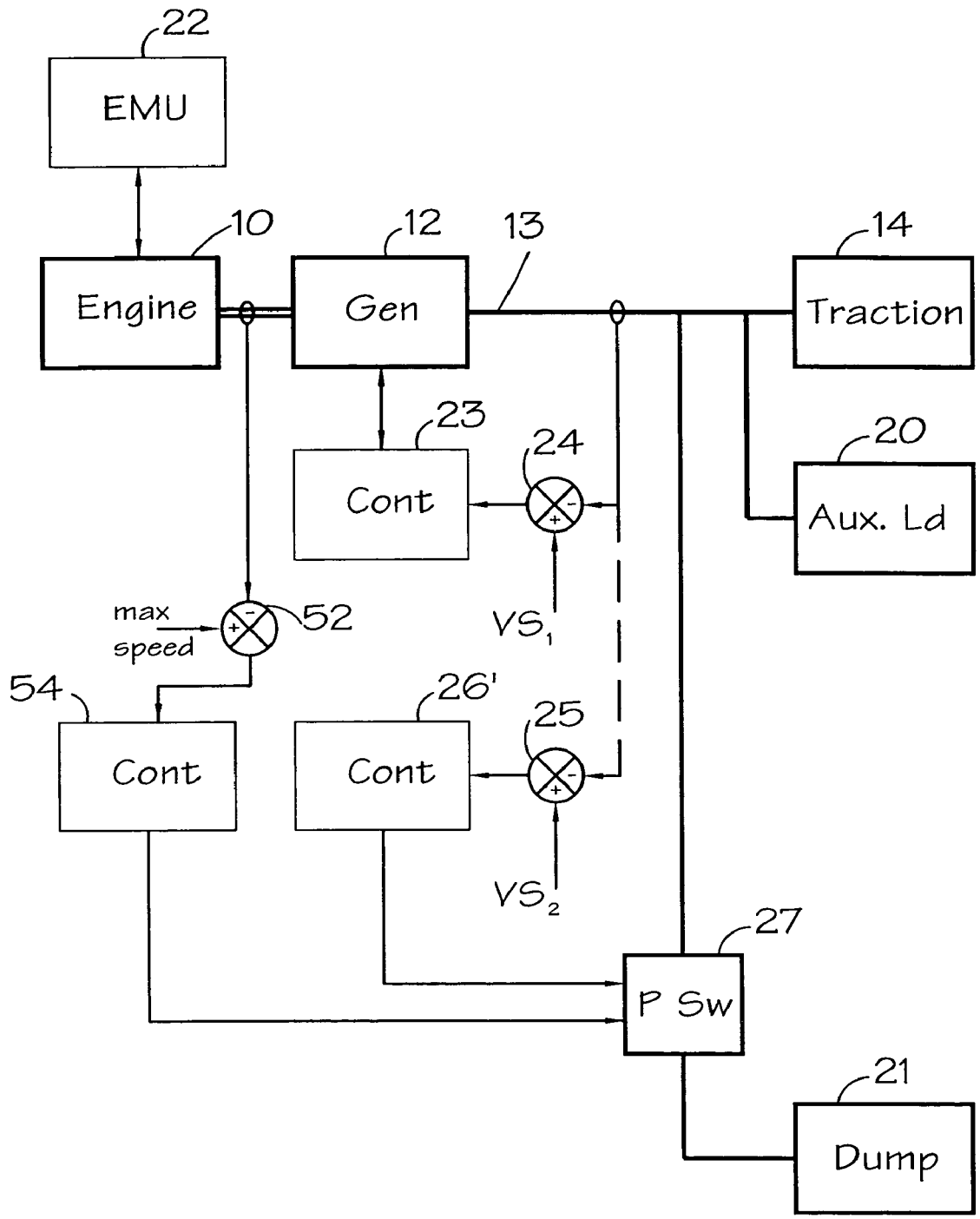
FIG. 4 shows a control schematic according to another aspect of the invention.

A second embodiment of the invention is shown schematically in FIG. 4. In this arrangement, the inner control loop of the controller 23 and the comparator 24, based on control of the output of the motoring machine 12, remains active throughout the entire braking cycle. As the braking power being fed onto the bus 13 increases, this loop increases the demand on the electrical machine 12, which in turn drives up the speed of the engine to achieve power balance in the system. As the engine speed reaches its limit, an outer control loop, comprising PID controller 54 and comparator 52, becomes active and sets the duty of the power switch 27 to dump the power which cannot be absorbed by the engine. It will be noted that there is now no handover of control from one loop to another: the inner loop remains active. As before, the safety control loop comprising controller 26' and 25 is optionally left in place to operate the power switch 27 if there is a failure in another part of the system.

In this embodiment the enabled outer control loop actuates the switch 27 to dump power from the voltage bus, allowing the inner control loop to react to the new voltage accordingly. If the bus voltage reduces below that causing maximum speed of the engine 10, the inner controller simply carries on while the outer control loop reduces the duty of power switch 27 to zero. This system controls the voltage bus 13 around the same set point $VS_1$ regardless of the amount of braking power being produced by the traction motors 14. This system now exhibits several further advantages: the auxiliary loads are supplied at a stable voltage, generally eliminating any voltage transients; any mechanical loads on the engine are supplied with power from the traction motors whenever it is available, thus economizing on fuel; the braking effort of the engine is used to its maximum, thus making use of the existing cooling system(s) on the engine, and the duty of the energy dump is minimized, thus reducing the cooling requirements and saving in cost and space.

In practice, the implementation of the controllers 23, 26' and 54 and associated functions, such as the comparators 24, 25 and 52, is conveniently implemented in a microprocessor with analog interfaces to the transducers for speed and voltage, as will be well understood by those skilled in the art. The control algorithms used by the controllers can be any of the appropriately known control laws.

The skilled person will appreciate that variation of the disclosed arrangements is possible without departing from the invention. For example, embodiments of the invention are described in the context of vehicle traction. It will be readily appreciated by those of ordinary skill in the art that the load driven variously by the electrical motors fed by the generator and the prime mover could equally well be some other driven load of a moving or static nature. Accordingly, the above description of is made by way of example and not for the purposes of limitation. It will be clear to the skilled person that minor modifications can be made to the arrangements without significant changes to the operation described above.

What is claimed is:

1. A controller for a power train which includes a prime mover, a first electrical machine mechanically connected to the prime mover, a second electrical machine electrically connected to the first electrical machine by a voltage bus, and dissipation means connected to the voltage bus for dissipating electrical power, the controller comprising:
   means for providing a speed signal indicative of a speed of the prime mover; and
   first control means responsive to the speed signal to divert power generated by either the first or second electrical machine from the bus to the dissipation means in which the first control means is enable by the speed signal to maintain the bus votage substantially at a desired level by diverting power from the bus to the dissipation means in both motoring or braking modes of the second electrical machine.

2. A controller as claimed in claim 1, in which the means for providing the speed signal is operable to produce the speed signal when the speed of the prime mover reaches a threshold.

3. A controller as claimed in claim 1 in which the first control means is enabled by the speed signal to maintain the bus voltage substantially at a desired level by diverting power from the bus to the dissipation means in both motoring and braking modes of the second electrical machine.

4. A controller as claimed in claim 1, including switch means actuatable by the first control means for controlling the flow of power to the dissipation means.

5. A controller as claimed in claim 1 in which the first control means includes an error signal representing a difference between a desired speed and an actual speed of the prime mover above the desired speed, the first control means being operable to divert power to the dissipation means in accordance with the error signal.

6. A controller as claimed in claim 5 in which the first control means is operable to divert power to the dissipation means according to a control law function of the speed of the prime mover.

7. A controller as claimed in claim 6 in which the control law function is a proportional/integral/derivative function.

8. A method of controlling a power train which includes a prime mover, a first electrical machine mechanically connected to the prime mover, a second electrical machine electrically connected to the first electrical machine by a voltage bus, and dissipation means connected to the voltage bus for dissipating electrical power, the method comprising:
   providing a speed signal indicative of a speed of the prime mover; and
   diverting power generated by either the first or second electrical machine from the bus to the dissipation means in response to the speed signal including enabling maintenance of bus voltage substantially at a desired level in accordance with the speed signal by diverting power from the bus to the dissipation means in motoring or braking modes of the second electrical machine.

9. A method as claimed in claim 8 in which the speed signal is produced when the speed of the prime mover reaches a threshold.

10. A method as claimed in claim 8 including enabling maintenance of bus voltage substantially at a desired level in accordance with the speed signal by diverting power from the bus to the dissipation means in both motoring and braking modes of the second electrical machine.

11. A method as claimed in claim 8, including actuating switch means for controlling the flow of power to the dissipation means.

12. A method as claimed in claim 8 including using feedback indicative of voltage on the bus to control bus voltage by diverting power to the dissipation means.

13. A method as claimed in claim 8 including generating an error signal which represents a difference between a desired speed and an actual speed of the prime mover above the desired speed, and diverting power to the dissipation means in accordance with the error signal.

14. A method as claimed in claim 13 in which power is diverted to the dissipation means according to the speed of the prime mover.

15. A power train system comprising a prime mover operable to provide and absorb mechanical power, a voltage bus, a first electrical machine operable as a generator to generate electrical power onto the voltage bus from the power delivered by the prime mover, and as a motor to deliver mechanical power absorbed by the prime mover; at least one second electrical machine connected to the voltage bus and operable to be driven by the electrical power generated by the first electrical machine and as a generator to deliver electrical power onto the voltage bus to drive the first electrical machine; dissipation means for dissipating electrical power from the voltage bus; means for providing a speed signal indicative of the speed of the prime mover; and a controller responsive to the speed signal and the voltage on the bus to divert power from the bus to the dissipation means to maintain the bus voltage at a substantially constant level.

\* \* \* \* \*

UNITED STATES PATENT AND TRADEMARK OFFICE
CERTIFICATE OF CORRECTION

PATENT NO. : 7,091,627 B2  
APPLICATION NO. : 10/836874  
DATED : August 15, 2006  
INVENTOR(S) : Michael James Turner and Paul Andrew Sykes Page 1 of 1

It is certified that error appears in the above-identified patent and that said Letters Patent is hereby corrected as shown below:

The Title page (73) Assignee should read:

--Switched Reluctance Drives Limited, Harrogate (GB)--

Signed and Sealed this

Fifth Day of December, 2006

JON W. DUDAS  
*Director of the United States Patent and Trademark Office*